United States Patent [19]
Wheeler, Sr. et al.

[11] Patent Number: 5,361,509
[45] Date of Patent: Nov. 8, 1994

[54] ELECTRICAL BOX INSTALLATION TOOL

[76] Inventors: Charles H. Wheeler, Sr., P.O. Box 8584 1112 Lodi, S. Lake Tahoe, Calif. 95731; Thomas N. Wheeler, 19745 Madison Rd., Nampa, Id. 83687

[21] Appl. No.: 113,846

[22] Filed: Aug. 27, 1993

[51] Int. Cl.[5] .............................. B25H 7/00
[52] U.S. Cl. ...................... 33/528; 33/DIG. 10; 269/904
[58] Field of Search ............... 33/528, 613, DIG. 10; 269/903, 904

[56] References Cited

U.S. PATENT DOCUMENTS

| | | | |
|---|---|---|---|
| 2,919,913 | 1/1960 | Phair | 269/115 |
| 2,956,798 | 10/1960 | Briggs | 269/190 |
| 2,962,281 | 11/1960 | Hodgson | 269/190 |
| 2,990,172 | 6/1961 | Gianotta | 269/116 |
| 3,154,304 | 10/1964 | Crawford | 269/47 |
| 3,436,070 | 4/1969 | Utley et al. | 269/8 |
| 3,522,658 | 8/1970 | Howell | 33/528 |
| 3,601,386 | 8/1971 | Estep | 269/6 |
| 3,617,044 | 11/1971 | Strange | 269/6 |
| 3,678,588 | 7/1972 | Isola et al. | 33/180 |
| 3,751,026 | 8/1973 | Stickney | 269/97 |
| 3,842,510 | 10/1974 | Elliott | 33/528 |
| 3,875,669 | 4/1975 | Hull | 33/180 |
| 3,954,717 | 5/1976 | Tarr | 269/82 |
| 4,181,295 | 1/1980 | Duffy | 269/3 |
| 4,290,591 | 9/1981 | Smith | 269/6 |
| 4,404,751 | 9/1983 | Rieckenberg | 33/180 |
| 4,479,639 | 10/1984 | Kane | 269/6 |
| 4,645,089 | 2/1987 | Horsley | 220/3.6 |
| 4,706,359 | 11/1987 | Greenhill, Sr. et al. | 29/271 |
| 4,750,271 | 6/1988 | Ericksen | 33/613 |
| 4,791,731 | 12/1988 | Dickinson et al. | 33/528 |
| 4,850,115 | 7/1989 | Price et al. | 33/528 |
| 4,888,879 | 12/1989 | Dixon | 33/613 |

Primary Examiner—William A. Cuchlinski, Jr.
Assistant Examiner—G. Bradley Bennett
Attorney, Agent, or Firm—Steven R. Ormiston

[57] ABSTRACT

A tool for holding electrical boxes in position for attachment to upright studs in residential and commercial building construction. The tool comprises a main body made of an elongated tubular support member, a holder attached to the main body for releasably holding an electrical box in position for installation, a height adjuster connected to the main body for positioning the electrical box at a predetermined distance above the floor, a depth adjuster attached to the main body for positioning the electrical box at a predetermined depth relative to the face of the upright stud, and an alignment device attached to the main body for positioning the electrical box so that the sides of the box are parallel to the sides of the upright stud. One aspect of the invention provides a clamping trigger for automatic activation of the box gripping force. The clamping trigger is located and configured so that electrical boxes which are presented in misalignment do not activate the trigger. The tool has a resetting means for quick release of the box gripping force and simultaneous resetting of the clamping trigger.

26 Claims, 9 Drawing Sheets

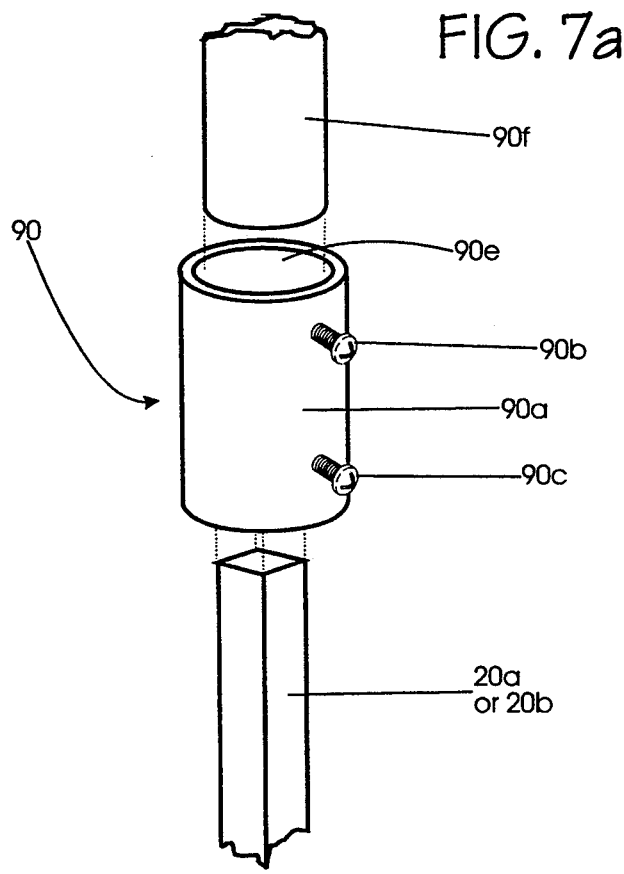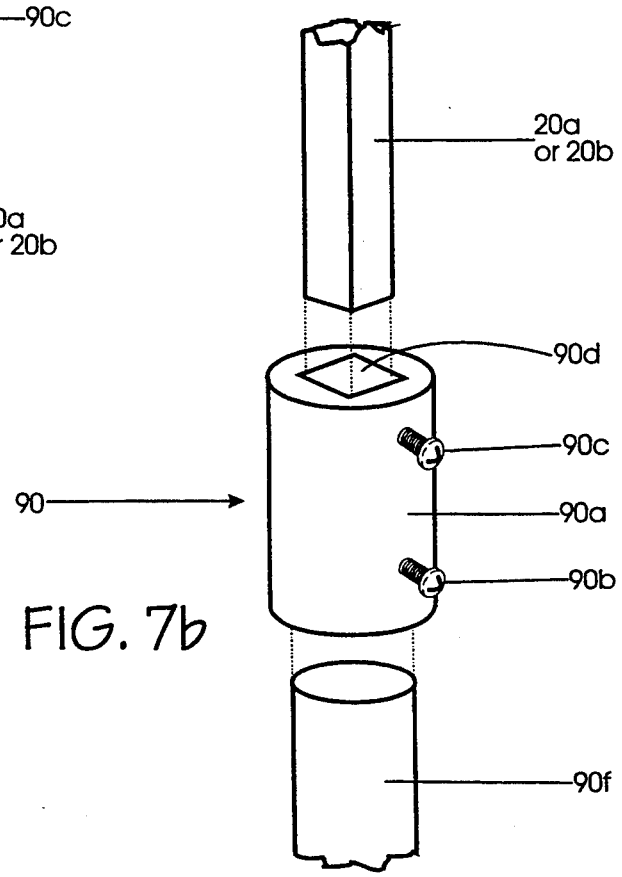

ELECTRICAL BOX INSTALLATION TOOL

FIELD OF THE INVENTION

This invention generally relates to the installation of electrical boxes in residential and commercial building construction, and more particularly to a device for holding electrical boxes in position for attachment to upright studs.

BACKGROUND OF THE INVENTION

After a building's framing has been completed, electrical boxes to accommodate the building's electrical outlets, switches, light fixtures and other wiring devices are attached to the wood or metal studs. These boxes must be located at predetermined distances from the floor. The boxes must also be mounted to extend outwardly at the front surface of the studs at a distance to accommodate the thickness of the finished wall materials.

The electrician or electrician's helper typically relies on only the most basic tools for the task of installing electrical boxes on the framing components of a building. These basic tools consist of such things as a hammer and tape measure. Each time an electrical outlet or switch box is installed, two separate measurements must be made. First, the distance from the floor must either be independently measured then marked on the stud or established using a stick marked at the proper heights for the various boxes. Second, the distance by which the box must extend beyond the face of the stud is determined. To save time, this depth measurement may just be estimated, sometimes with the help of some depth markings along the outside face of the junction box. This practice often results in boxes that do not protrude far enough or, worse, protrude too far from the surface of the studs. In addition, if a box is not held securely while fastening, it can be set at an angle to the surface of the stud. Any of these conditions result in difficulties during the finish stage of the project.

A typical residential building can use hundreds of electrical boxes for outlets, switches, TV cable, telephone, intercoms, etc. Typical commercial structures require even greater quantities of electrical boxes. After installing several dozen boxes, especially those which are mounted near to the floor level, the worker can experience fatigue and back pain. If the worker is not highly skilled, or if he or she is pressured to work too quickly, boxes may be poorly aligned to the framing, and mounting heights from the floor may not be consistent. This frequently results in later difficulties and quality problems when the finish work is completed (installation of receptacles and switches, etc.).

Many electricians, apprentices and helpers would find it very beneficial, therefore, to have a tool that helps in installing electrical boxes at the proper height, depth, and alignment without the need for repeated measuring, bending or kneeling.

Several devices have been designed to hold electrical boxes at the proper depth from and alignment to the surface of the upright stud. These devices have a number of limitations and disadvantages that are not present in the applicants' invention. For example, the devices disclosed in the relevant art will not securely hold the wide variety of electrical box sizes and shapes currently in use. Boxes are now available in varying widths, with two, three and even four-gang boxes not uncommon. Rectangular, square, hexagonal and partially circular shapes are typical. These devices cannot be used with the many electrical boxes having protuberances on their inside walls for grounding straps, multi-size fixture mounting structures and the like. These devices do not allow for the installation of boxes on multiple stud widths typically found in light switch boxes adjacent to doorways. A further limitation of the devices disclosed in the relevant art is the inability to install boxes at varying depths relative to the surface of the stud without exchanging or adding components to the device. With a few exceptions, these devices do not eliminate the need for repeated bending or kneeling to install the lower mount boxes.

Insofar as applicants are aware, the most relevant art is illustrated in U.S. Pat. No. 4,850,115 (Price et al.). The Price device allows installation of electrical boxes at a range of elevations, but at only one depth setting without removing and exchanging parts. The Price device is further limited in the range of height settings by the overall length of the device's "tubular support member" which is stated to be five (5) feet long in an actual embodiment. The Price device relies on a U-shaped spring as a gripping means which contacts only a very small percentage of the surface area of the box. This gripping means cannot securely grip a box of larger than single-gang size, especially if these larger boxes are made of steel or some other relatively heavy substance.

Some attempts have been made to more securely grip the box, such as the internal expansion bands used in the device shown in U.S. Pat. No. 4,888,879 (Dixon). The internal expansion bands of Dixon function with electrical boxes of only one width (single-gang). In U.S. Pat. No. 4,181,295 (Duffy), an increased gripping surface area was added by including a thin steel blade which slides between the box and the side of the stud. The Duffy device must be withdrawn before the box is securely fastened to the stud. Failure to withdraw this device at the proper instant would result in its being lodged in place between the box and the stud.

In U.S. Pat. No. 4,479,639 (Kane), an attempt was made to accommodate protuberances on the inside walls of electrical boxes. The Kane device, however, functions with a very limited size and configuration of an internal appurtenance which is typical only on an obsolete round fixture box design. The Kane device continues to rely on at least one gripping surface contacting the internal walls of the box. Modern plastic fixture boxes include many variations on internal design which the Kane device does not address.

SUMMARY OF THE INVENTION

Accordingly, the principle objects and advantages of this invention are to provide a tool which:

allows easy, accurate and fast installation of a wide range of sizes, shapes and material composition of electrical boxes;

automatically and firmly grips the box throughout the installation process, at the completion of which the box is readily and easily released, and the tool is ready to receive the next box;

ensures that all boxes are installed with the correct alignment and parallelism to the upright studs, while automatically rejecting attempts to load boxes in a misaligned state;

is able to accommodate the wide variety of internal protuberances on the inside walls of modern electrical boxes;

installs boxes on either left or right stud surfaces, with studs of wood or metal in single or multiple widths;

allows box installation at a wide range of user-selectable heights from the floor, and protrusion distances from the surface of the stud, without the need for exchanging or adding components;

allows preset height adjustments for up to two discrete box heights without the need for readjusting tool settings;

allows for an extension device which provides an increased range of custom height settings beyond the tool's standard ranges;

allows box installation without bending or kneeling even at the typically low receptacle box heights of 10 to 12 inches from the floor; and requires a minimum of skill and training to use.

According to the present invention, the above and other objects are achieved by an improved electrical box installation tool having a main body made of an elongated tubular support member. A holder is attached to the main body. The holder grips (and releases) the outside surface of an electrical box, thus accommodating any internal protuberances. The holder is adjustable to accommodate different sizes and shapes of electrical boxes. A height adjuster is connected to the main body for positioning the electrical box at a predetermined distance above the floor. A depth adjuster is attached to the main body for positioning the electrical box at a predetermined depth relative to the face of the upright stud. An alignment device is also attached to the main body for positioning the electrical box so that the sides of the electrical box are parallel to the sides of the upright stud.

Another aspect of the invention provides a clamping trigger for automatic activation of the box gripping force, achieved by contact of the face of an electrical box with the trigger. The clamping trigger is located and configured so that electrical boxes which are presented in misalignment to the clamping jaws do not activate the trigger. The tool has a resetting means for quick release of the box gripping force and simultaneous resetting of the clamping trigger.

Another aspect of the invention provides alignment guides for adjustable depth setting and parallel alignment in relation to upright stud surfaces, without limitation as to single or multiple stud widths or to installation on left or right stud surfaces. The tool may also have height adjusters on opposing ends, accommodating simultaneous use of two discrete height settings.

Other objects, advantages and novel features of the invention will become apparent to those skilled in the art from the following detailed description, wherein we have shown and described only the preferred embodiment of the invention, simply by way of illustration of the best mode contemplated by us of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 7a and 7b are perspective views of a height extension adapter used to extend the tool's available range of height settings.

DETAILED DESCRIPTION OF THE INVENTION

Figure 1:
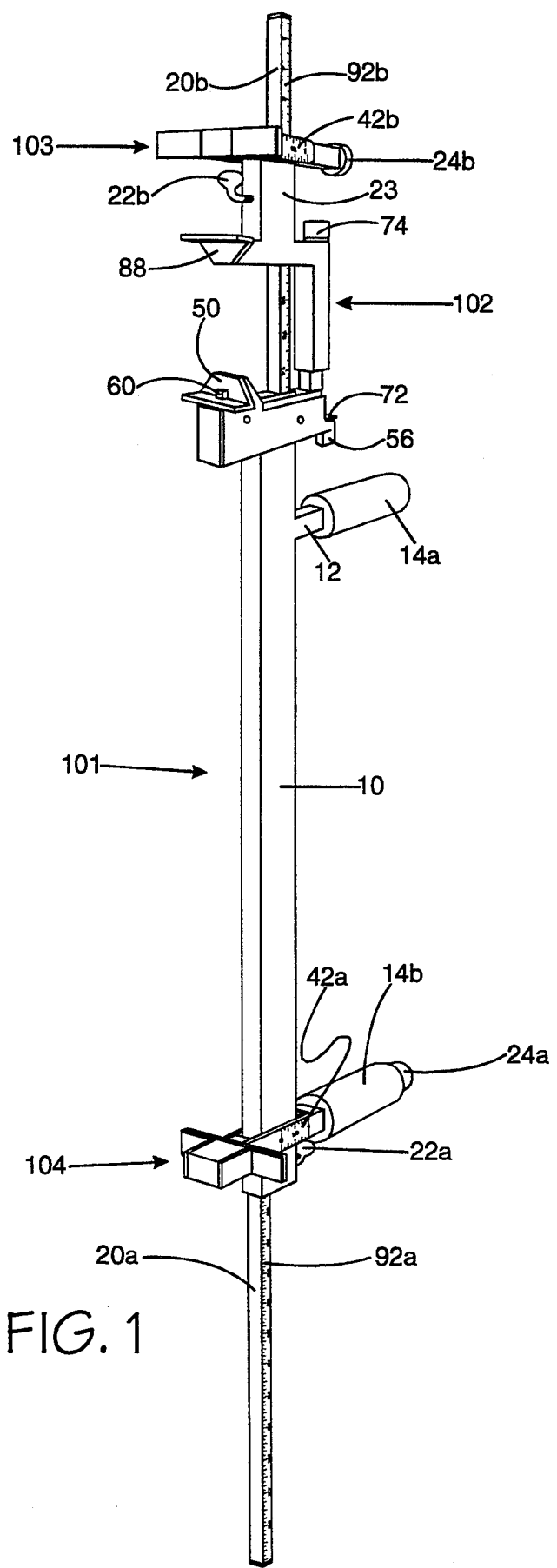
FIG. 1 is an overall perspective view of the tool with its basic assemblies attached, and ready for use.

FIG. 1 is a perspective view of the electrical box installation tool illustrating the preferred embodiment of the invention. The tool is comprised of four basic assemblies: a main body assembly 101; a box clamp assembly 102; a box depth assembly 103; and a box depth and stud side alignment assembly 104.

In the preferred embodiment, most components are made of rectangular or square steel tubing, or flat steel stock.

Referring to FIG. 1, the main body assembly 101 is comprised of a main body 10, made of rectangular tubing. A hand grip arm 12 is fixedly attached to the main body 10. A hand grip 14a, is mounted on the hand grip arm 12. A second hand grip 14b is mounted on the box depth and stud side alignment assembly 104. A slidably adjustable high mount adjustment rod 20a (approximately 26 inches length in the preferred embodiment) is inserted into the bottom end 10d of main body 10. A slidably adjustable low mount adjustment rod 20b is inserted into the passive clamp body 23. A high mount adjustment scale 92a and low mount adjustment scale 92b is reproduced in a conventional manner such as silk-screening on one surface of the high mount adjustment rod 20a and low mount adjustment rod 20b. Alternatively, the scales could be applied as labels or etched into the metal surfaces. Height adjustment screws 22a and 22b are threaded into main body 10 and passive clamp body 23 for securing high mount adjustment rod 20a and low mount adjustment rod 20b.

Figure 2:
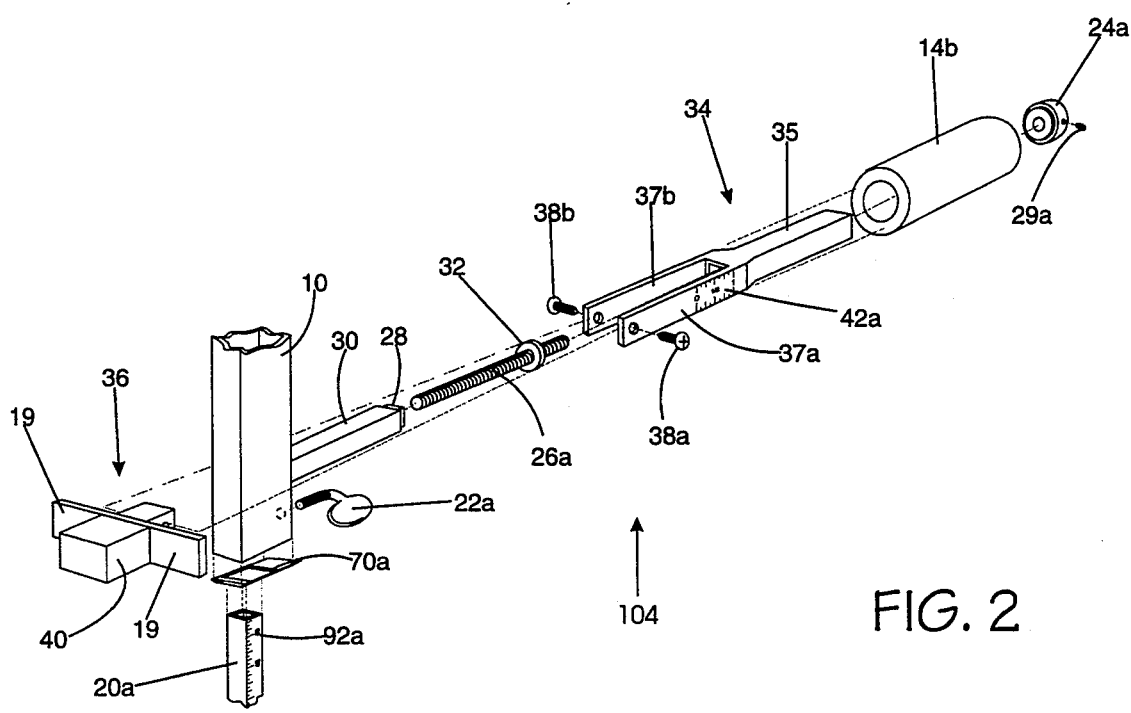
FIG. 2 is an exploded view of the tool's assembly for setting the box depth and alignment to the surface and side face of the stud.

Referring now to FIG. 2, which shows an exploded view of the box depth and stud side alignment assembly 104, a depth adjustment knob 24a is secured to a threaded rod 26a by a screw 29a. Threaded rod 26a is threaded into a nut 28 fixedly attached to the end of a square tubing 30. The square tubing 30 is fixedly attached to the main body 10. A stop collar 32 is affixed onto threaded rod 26a, into position to allow space for a guide body 34 to slide over threaded rod 26a and be held in place by depth adjustment knob 24a. Guide body 34 is comprised of a tubular channel 35 fixedly attached to a pair of flat alignment forks 37a and 37b. A depth setting scale 42a is affixed to one face of the alignment forks in a conventional manner. Alignment forks 37a and 37b are affixed to the sides of a stud positioning block 36 by screws 38a and 38b. Hand grip 14b slides over tubular channel 35. Stud positioning block 36 is comprised of a pair of stud face guides 19 extending outwardly from a stud side guide 40.

Figure 3A:
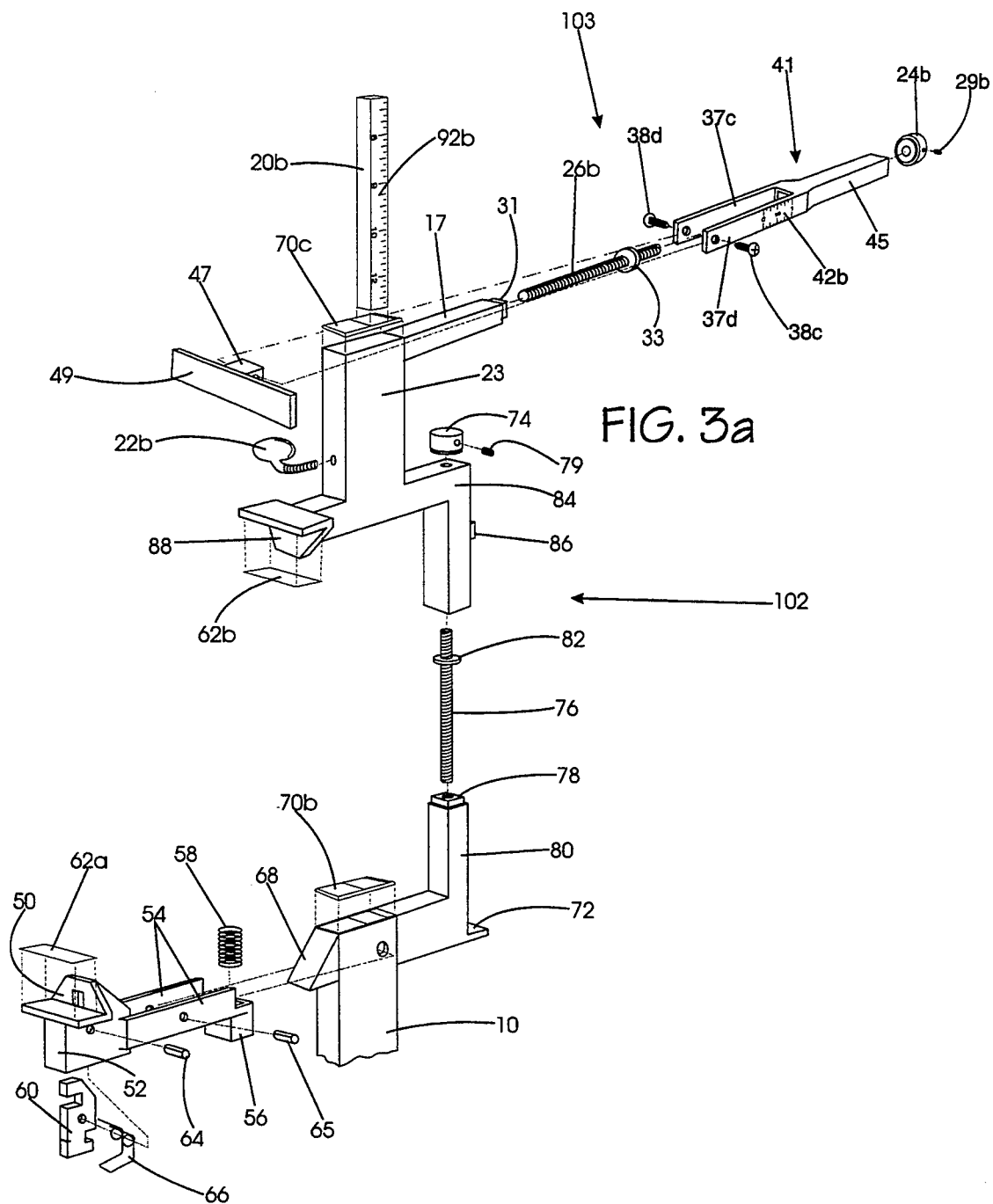
FIG. 3a is an exploded view of the box clamp and depth assemblies.
Figure 3B:
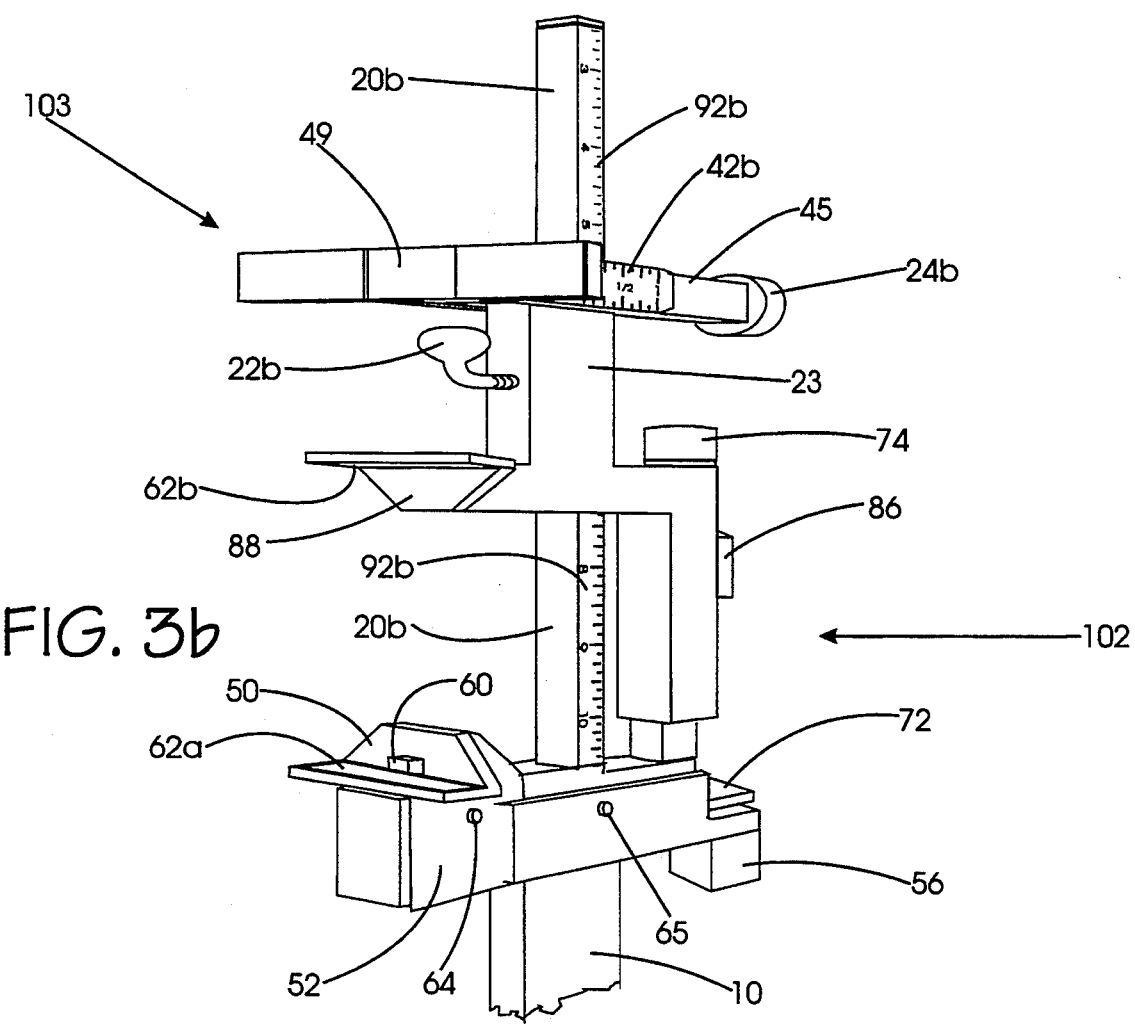
FIG. 3b is a perspective view of the box clamp and depth assemblies as shown in FIG. 3a, fully assembled.

FIG. 3a and FIG. 3b show the box clamp assembly 102 and the box depth assembly 103. FIG. 3a is an exploded view and FIG. 3b is an assembled perspective view. An active clamp jaw 50 is fixedly attached to a trigger housing 52. Two active clamp forks 54 are fixedly attached to the trigger housing 52. A clamp pressure spring housing 56, made of square tubing, is fixedly attached to active clamp forks 54, comprising a single open end to accommodate a clamp pressure spring 58.

A box grip pad 62a, made of a non-slip material, is fixedly attached to active clamp jaw 50.

A box clamping trigger 60, made of plastic or aluminum, is secured in trigger housing 52 by pivot pin 64. Alternatively, box clamping trigger may be an "S" shaped rod. A trigger spring 66, also secured in position by pivot pin 64 is releasably attached to clamping trigger 60 and inside trigger housing 52.

Active clamp forks 54 are pivotally attached to the main body 10 by pivot pin 65. A trigger catch 68 is fixedly attached to main body 10. An alternate embodiment does not utilize the trigger catch 68, but instead uses a round hole drilled in the face of the main body 10 to receive a clamp trigger made of an "S" shaped rod.

A main body cap 70b, made of plastic or other suitable material is secured inside the open end of main body 10. A hole is cut into main body cap 70b to receive low mount adjustment rod 20b. A similar main body cap 70a is secured inside the opposite end of the main body 10 as shown in FIG. 2.

A clamp cocking lever 72 is fixedly attached to active clamp body 80.

Box size adjustment knob 74 is secured to threaded rod 76 by screw 79. Threaded rod 76 is threaded into a nut 78 fixedly attached to the end of active clamp body 80. Active clamp body 80 is fixedly attached to main body 10. A stop collar 82 is affixed onto threaded rod 76, into position to allow space for a passive clamp body 84 to slide over threaded rod 76 and be held in place by box size adjustment knob 74.

Box size adjustment stop 86 and passive clamp jaw 88 are fixedly attached to passive clamp body 84. Box grip pad 62b, made of a non-slip material, is fixedly attached to passive clamp jaw 88.

Figure 3C:
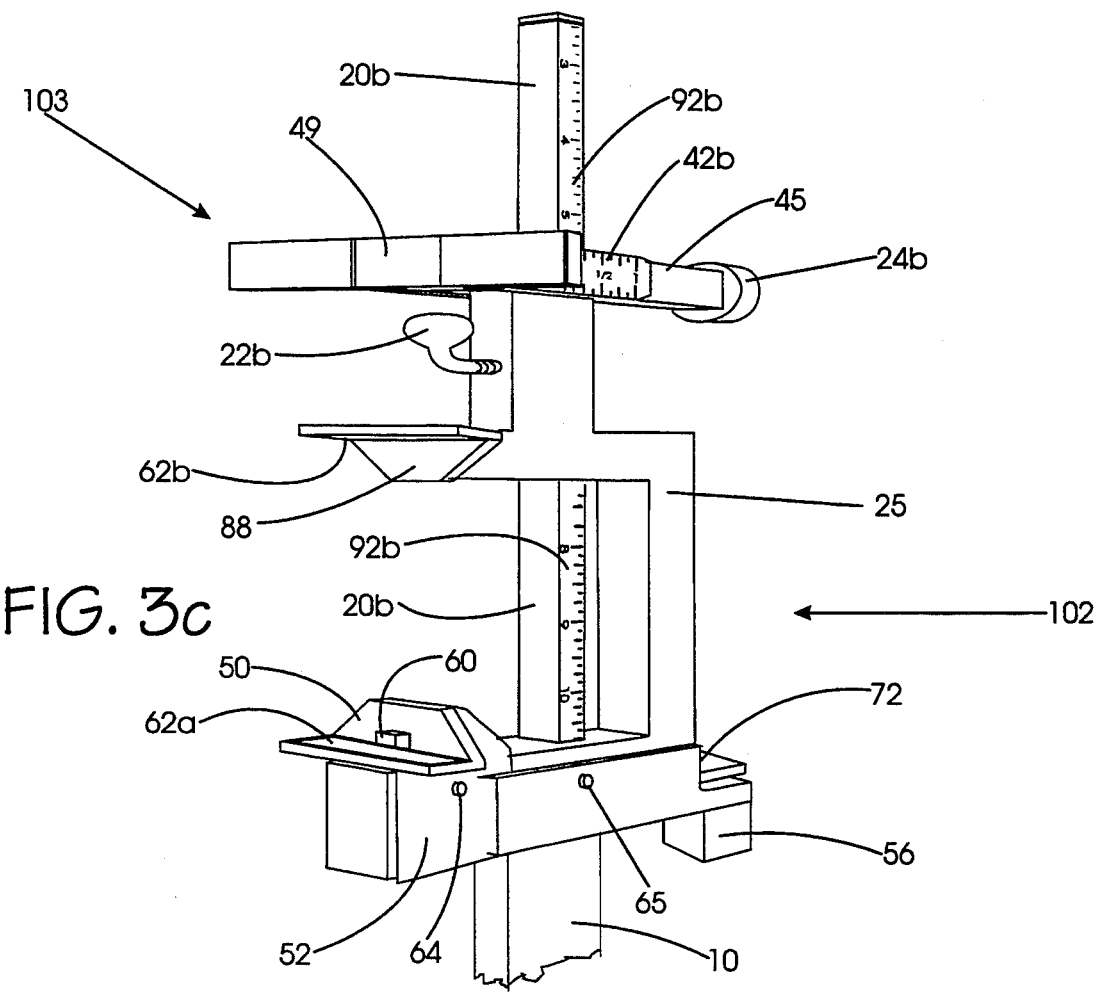
FIG. 3c is a perspective view of an alternate embodiment of the box clamp assembly.

FIG. 3c illustrates an alternate embodiment wherein box clamp assembly 102 includes a non-adjustable clamp body 25.

FIG. 3a and FIG. 3b also illustrate the box depth assembly 103. Depth adjustment knob 24b is secured to threaded rod 26b by screw 29b. Threaded rod 26b is threaded into a nut 31 fixedly attached to the end of a square tubing 17. Square tubing 17 is fixedly attached to passive clamp body 23. Stop collar 33 is affixed onto threaded rod 26b, into position to allow space for a tubular guide body 41 to slide over threaded rod 26b and be held in place by depth adjustment knob 24b. Guide body 41 is comprised of a tubular channel 45 fixedly attached to a pair of flat alignment forks 37c and 37d. A depth setting scale 42b is reproduced on one face of the alignment forks. Alignment forks 37c and 37d are affixed to the sides of a stud positioning block 47 by screws 38c and 38d. A planar surfaced, stud face guide 49, extends outwardly from stud positioning block 47.

A passive clamp body cap 70c, made of plastic or other suitable material is secured inside passive clamp body 23. A hole is cut into passive clamp body cap 70c to receive low mount adjustment rod 20b.

Figure 4A:
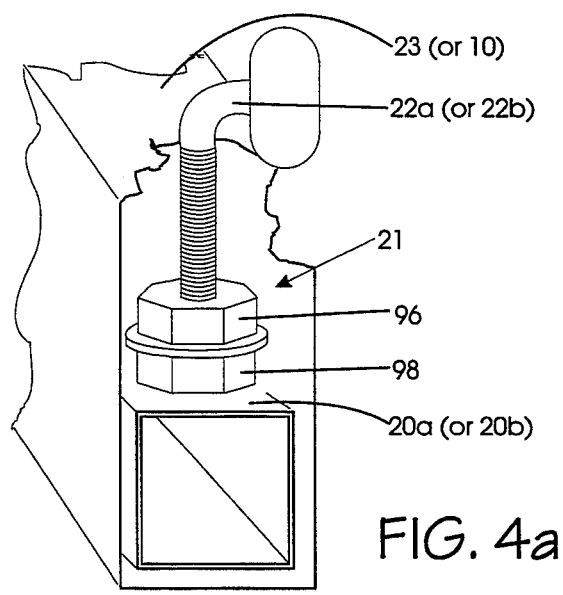
FIG. 4a and 4b are cutaway perspective views of alternate embodiments of an assembly used for securing the height adjustment rods in place.
Figure 4B:
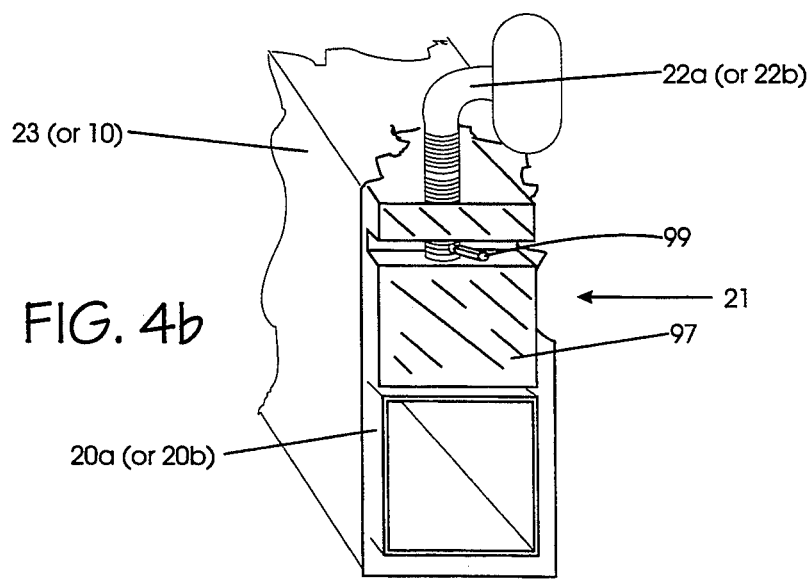

Referring now to FIGS. 4a and 4b which show cutaway perspective views of two alternate embodiments of height adjustment clamping mechanism 21. In the embodiment shown in FIG. 4a, height adjustment screw 22a or 22b is inserted through a threaded hole in main body 10 or passive clamp body 23. A standard hex nut 96, is threaded onto the end of height adjustment screw 22a or 22b, leaving a portion of the screw protruding beyond hex nut 96. A locking hex nut 98, made of nylon in the preferred embodiment, is threaded onto the protruding end of the height adjustment screw 22a or 22b and secured tightly to lock the two nuts 96 and 98 into place. The high mount adjustment rod 20a or low mount adjustment rod 20b is inserted through passive clamp body 23, or main body 10, and secured in place by pressure exerted when the height adjustment screw 22a or 22b is turned in a clockwise direction, causing the locking hex nut 98 to press against the high or low mount adjustment rod 20a or 20b.

In an alternate embodiment of the height adjustment clamping mechanism 21 as shown in FIG. 4b, standard hex nut 96 and locking hex nut 98 are replaced by a rectangular clamp block 97 and a tension pin 99. Height adjustment screw 22a or 22b is inserted through a threaded hole in main body 10 or passive clamp body 23. Tension pin 99 is affixed to height adjustment screw 22a or 22b within a slot in clamp block 97. Clamp block 97 is pressed against the high or low mount adjustment rod 20a or 20b when adjustment screw 22a or 22b is turned in a clockwise direction.

FIGS. 7a and 7b show two perspective views of a height extension adapter 90. A pair of screws 90b and 90c are threaded into a tubular adapter body 90a. The tubular adapter body 90a has a square-shaped receptor area 90d in one end and a circular-shaped receptor area 90e in the opposite end.

Installing High Mount Boxes

High Mount Boxes are electrical boxes that are typically installed between 26 and 49 inches from the floor, such as are used for room light switches and kitchen or utility room counter top areas. The tool is used as shown in FIG. 1, with high mount adjustment rod 20a toward the floor.

Referring to the dimensions on the high mount adjustment scale 92a, the user turns height adjustment screw 22a in a clockwise direction to lock high mount adjustment rod 20a into position for placing the box at the desired height from the floor.

Using the depth adjustment knobs 24a, and 24b and referring to the depth adjustment scales 42a and 42b, the user then adjusts the box depth and stud side alignment assemblies 103 and 104 to allow the front surface of the boxes to protrude the proper distance from the face of the building's upright studs. This is to accommodate the finish material to be applied (typically $\frac{1}{2}$ inch or $\frac{5}{8}$ inch gypsum wallboard). Turning the depth adjustment knobs 24a and 24b in a clockwise direction causes the depth guides to move toward the upright stud, and the resulting box placement to protrude less. Turning the depth adjustment knobs 24a and 24b in a counter-clockwise direction causes the depth guides to move away from the upright stud, and the resulting box placement to protrude more. In this manner, the tool can accommodate a range of finish wall material thicknesses without the need to interchange any parts.

Next, the user adjusts the distance between the active and passive clamp jaws 50 and 88 to accommodate the height of the boxes to be installed. This is accomplished by holding a box between the clamp cocking lever 72, and the box size adjustment stop 86 while turning the box size adjustment knob 74. In this manner, the tool can accommodate a wide variety of box sizes without the need to interchange any parts.

Figure 5:
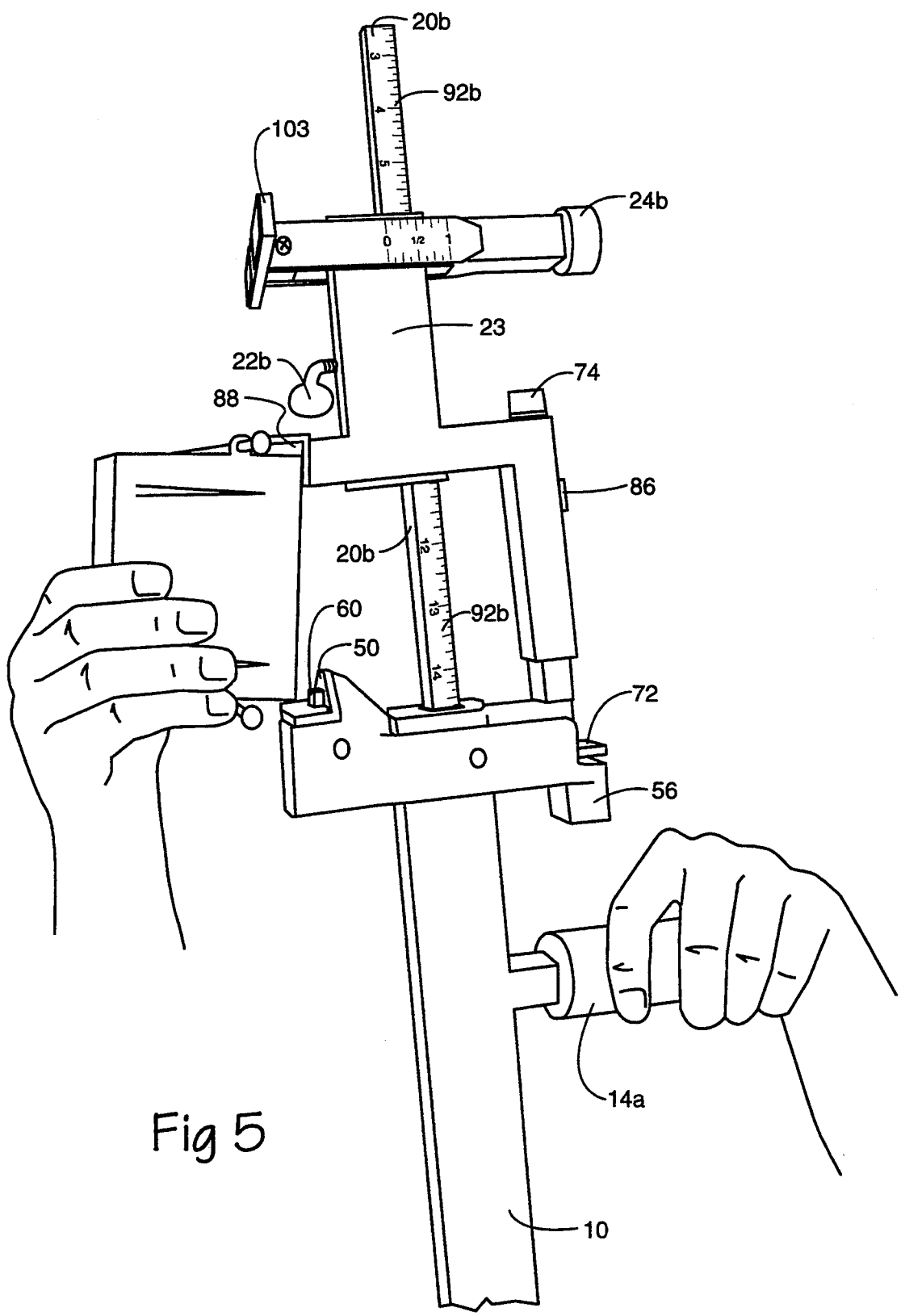
FIG. 5 is a perspective view of an electrical box being installed in the tool's box clamp assembly.

FIG. 5 shows a box being mounted in the tool (also refer to FIG. 3a and FIG. 3b). The user mounts an electrical box in the tool's active and passive box clamps 50 and 88 by holding the box between the clamps and pressing the edge of the box against box clamping trigger 60. If the user has already released a box from the clamp jaws, then the box clamping trigger will be in a "cocked" position, ready to receive the box. When pushed inward, the box clamping trigger 60 causes the active clamp jaw 50 to snap upward, gripping the box. The box is further secured in the active and passive clamp jaws 50 and 88 by box grip pads 62a and 62b.

Figure 6:
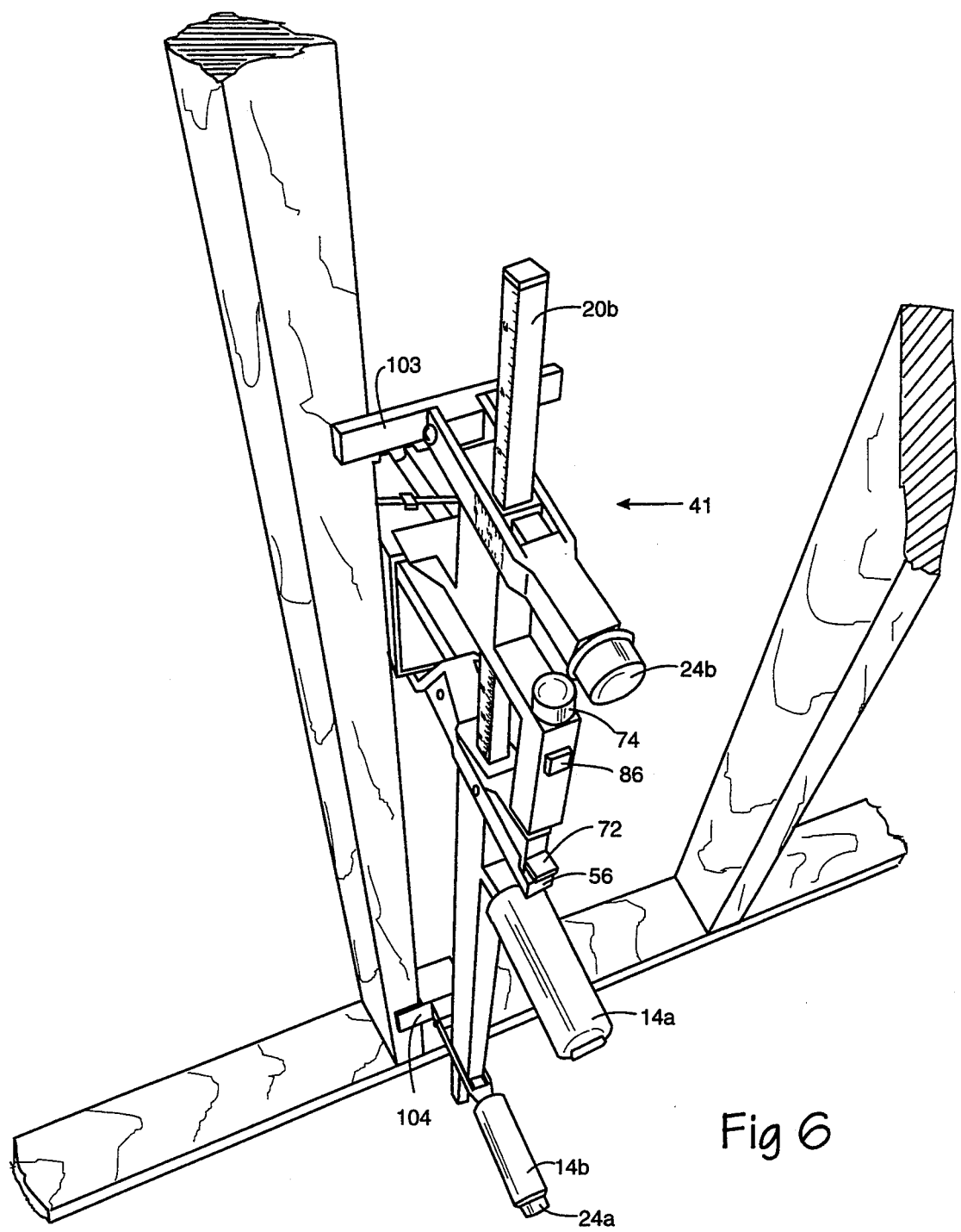
FIG. 6 is a perspective view of the tool being used to place an electrical box in position for attachment to the side of a stud.

With the box mounted in the tool, the user then grips one of the tool's hand grips 14a or 14b, to hold the tool in place alongside the building's upright stud as shown in FIG. 6. The box depth and stud side alignment assemblies 103 and 104 are held against the face and inner surface of the upright stud. The box is now precisely aligned and held firmly in place for installation.

After installing the box, the user releases the pressure of the box clamp assembly by squeezing clamp cocking lever 72, and clamp spring housing 56. Box clamping trigger 60 is now in a "cocked" position and the tool is ready to receive an electrical box as shown in FIG. 5.

Installing Low Mount Boxes

Low Mount Boxes are electrical boxes that are typically installed between approximately 3 and 26 inches from the floor, such as are used for electrical outlets, telephone, and TV cable. The tool is rotated so that the low mount adjustment rod 20b is toward the floor.

Referring to the dimensions on the low mount adjustment scale 92b, the user turns the height adjustment screw 22b in a clockwise direction to lock the low mount adjustment rod 20b into position for placing the box at the desired height from the floor.

If the box size and mounting depth adjustments are to remain the same as adjusted under Installing High Mount Boxes, above, then the tool is ready to receive an electrical box.

Next, the user mounts and installs the box in the same manner as in the high mount configuration. Due to the location of the tool's hand grips, a common framing hammer may be used to install the box without the need for bending, stooping or kneeling.

After installing the box, the user then releases the pressure of the box clamp assembly by stepping on the clamp spring housing 56. The box clamping trigger 60 is now in a "cocked" position and the tool is ready to receive an electrical box. When used in the high mount configuration, the user squeezes the clamp cocking lever 72, and the clamp spring housing 56 between thumb and forefinger by hand. Since it is close to the floor in the low mount configuration, the user can step on the clamp spring housing 56 instead, thus avoiding any need for bending.

Installing Boxes Beyond the Tool's Standard Height Range

Height extension adapter 90, shown in FIG. 7a and FIG. 7b, can be used to extend the tool's range of available height settings. The user installs the square receptor end of the adapter 90d over the high or low mount adjustment rod 20a or 20b. A length of standard ½ inch electrical-metallic tubing, conduit or similar material 90f is inserted in the opposite end of the adapter 90e, providing an extension for the height settings.

We claim:

1. A tool for installing electrical boxes, which comprises:
   a) a main body made of an elongated tubular support member having a top end and a bottom end;
   b) a holding means attached to the main body for releasably holding an electrical box, comprising (1) a clamp body made of rectangular tubing and being generally "C" shaped having a top horizontal portion, a vertical portion and a bottom horizontal portion, the bottom horizontal portion being attached to the main body, (2) an active clamp jaw made of flat bar and being generally "L" shaped having two flat perpendicular surfaces for holding an external surface of an electrical box, the active clamp jaw being attached to the bottom horizontal portion of the clamp body, and (3) a passive clamp jaw made of flat bar and being generally "L" shaped having two flat perpendicular surfaces for holding an external surface of an electrical box, the passive clamp jaw being attached to the top horizontal portion of the clamp body;
   c) a height adjustment means connected to the main body for positioning the electrical box at a predetermined distance above a floor;
   d) a depth adjustment means attached to the main body for positioning the electrical box at a predetermined depth relative to the face of an upright stud; and
   e) an alignment means attached to the main body for positioning the electrical box so that the sides of the electrical box are parallel to the sides of an upright stud.

2. A tool according to claim 1, further comprising box grip pads made of a thin layer of non-slip material overlying the horizontal surfaces of the active and passive clamp jaws.

3. A tool according to claim 1, further comprising a trigger means for automatically causing the clamp jaws to hold and release an electrical box.

4. A tool according to claim 3, wherein the trigger means comprises:
   a) a trigger housing defined by a first end made of two parallel flat bars disposed on either side of the top end of the main body and the bottom horizontal portion of the clamp body, the first end being rotatably attached to the top end of the main body, and a second end defined by a rectangular tube having the active clamp jaw attached thereto;
   b) a clamp cocking lever made of a rectangular flat bar attached to and extending from the bottom horizontal portion of the clamp body; and
   c) a first spring means disposed at the first end of the trigger housing and adapted to exert constant pressure upward against the clamp cocking lever so that the trigger housing rotates clockwise to exert a compressive gripping force on an electrical box inserted between the active and passive clamp jaws.

5. A tool according to claim 4, wherein the first spring means comprises:
   a) a clamp spring housing made of a rectangular box having one side open; and
   b) a coil spring having a first end and a second end, the first end being positioned in the clamp spring housing and the second end extending out of the clamp spring housing to engage the clamp cocking lever.

6. A tool according to claim 4, further comprising a second spring means attached to the second end of the trigger housing so that the trigger housing remains in a cocked position, wherein an electrical box may be inserted between the active and passive clamp jaws, unless and until an electrical box is placed into and against the surfaces of the active clamp jaw, wherein the trigger housing rotates to an uncocked position securing the electrical box between the active and passive clamp jaws.

7. A tool according to claim 6, wherein the second spring means is positioned so that the trigger housing will not rotate to an uncocked position securing the electrical box between the active and passive clamp jaws until the electrical box is properly aligned in the clamp jaws.

8. A tool according to claim 6, wherein the second spring means comprises:
   a) an active clamp jaw made of flat bar and being generally "L" shaped having a horizontal surface and a vertical surface with a hole therein;
   b) a box clamping trigger made of an "S" shaped member having an upper end a lower end and being rotatably connected to the second end of the trigger housing; and
   c) a spring attached to the second end of the trigger housing and the box clamping trigger so that the upper end extends through the hole in the active clamp jaw and the lower end engages the bottom horizontal portion of the clamp body to secure the trigger housing in the cocked position unless and until an electrical box is placed into and against the vertical surface of the active clamp jaw and the upper end extending therethrough, thereby rotating the box clamping trigger, disengaging the lower end from the horizontal portion of the active clamp jaw and moving the trigger housing to the uncocked position.

9. A tool according to claim 6, wherein the second spring means comprises:
   a) an active clamp jaw made of flat bar and being generally "L" shaped having a horizontal surface and a vertical surface with a hole therein;
   b) a box clamping trigger defined by a rectangular flat bar having a top portion and a bottom portion, each portion having a notch therein to form a top tab and a bottom tab, the notches being disposed on the bar so that the tabs point in opposite directions, the bar being rotatably connected to the second end of the trigger housing; and
   c) a spring attached to the second end of the trigger housing and the bottom portion of the box clamping trigger so that the top tab extends through the hole in the active clamp jaw and the bottom tab engages the bottom horizontal portion of the clamp body to secure the trigger housing in the cocked position unless and until an electrical box is placed into and against the vertical surface of the active clamp jaw and the top tab extending therethrough, thereby rotating the box clamping trigger, disengaging the bottom tab from the horizontal portion of the active clamp jaw and moving the trigger housing to the uncocked position.

10. A tool for installing electrical boxes, which comprises:
    a) a main body made of an elongated tubular support member having a top end and a bottom end;
    b) a holding means attached to the main body for releasably holding an electrical box, comprising (1) an active clamp body made of rectangular tubing and being generally "L" shaped having a horizontal portion attached to the top end of the main body and a vertical portion projecting upward from the horizontal portion away from the main body, (2) an active clamp jaw made of flat bar and being generally "L" shaped having two flat perpendicular surfaces for holding an external surface of an electrical box, the active clamp jaw being attached to the horizontal portion of the active clamp body, (3) a passive clamp body made of rectangular tubing having a horizontal portion with a first end and a second end, a top vertical portion disposed at the middle of and projecting upward from the horizontal portion, and a bottom vertical portion disposed at the first end of and projecting downward from the horizontal portion, (4) a passive clamp jaw made of flat bar and being generally "L" shaped having two flat perpendicular surfaces for holding an external surface of an electrical box, the passive clamp jaw being attached to the second end of the horizontal portion of the passive clamp body, and (5) the vertical portion of the active clamp body being attached to the bottom vertical portion of the passive clamp body so that an electrical box may be inserted and held between the active and passive clamp jaws;
    c) a height adjustment means connected to the main body for positioning the electrical box at a predetermined distance above a floor;
    d) a depth adjustment means attached to the main body for positioning the electrical box at a predetermined depth relative to the face of an upright stud; and
    e) an alignment means attached to the main body for positioning the electrical box so that the sides of the electrical box are parallel to the sides of an upright stud.

11. A tool according to claim 10, further comprising box grip pads made of a thin layer of non-slip material overlying the horizontal surfaces of the active and passive clamp jaws.

12. A tool according to claim 10, further comprising an adjusting means for adjusting the distance between the active and passive clamp jaws to accommodate different size electrical boxes.

13. A tool according to claim 12, wherein the adjusting means comprises:
    a) a threaded nut fixedly attached to the vertical portion of the active clamp body;
    b) a threaded rod having a top end and a bottom end, the top end extending through and being exposed above the bottom vertical portion of the passive clamp body and the bottom end threaded into the nut; and c) a stopping means for stopping the threaded rod from moving longitudinally relative to the passive clamp body so that when the threaded rod is rotated the active clamp body will be drawn toward or pushed away from the passive clamp body depending on the direction of rotation.

14. A tool according to claim 13, wherein the stopping means comprises:
   a) a cap on the bottom vertical portion of the passive clamp body with a hole therein so that the top of the threaded rod extends through the hole and is exposed above the vertical portion of the passive clamp body;
   b) an adjustment knob fixedly attached to the top end of the threaded rod; and
   c) a stop collar made of flat bar fixedly attached to the threaded rod immediately below the hole in the bottom vertical portion of the passive clamp body.

15. A tool according to claim 10, further comprising a trigger means for automatically causing the clamp jaws to hold and release an electrical box.

16. A tool according to claim 15, wherein the trigger means comprises:
   a) a trigger housing defined by a first end made of two parallel flat bars disposed on either side of the top end of the main body and the horizontal portion of the active clamp body, the first end being rotatably attached to the top end of the main body, and a second end defined by a rectangular tube having the active clamp jaw attached thereto;
   b) a clamp cocking lever made of rectangular flat bar attached to and extending from the horizontal portion of the active clamp body; and
   c) a first spring means disposed at the first end of the trigger housing and adapted to exert constant pressure upward against the clamp cocking lever so that the trigger housing rotates clockwise to exert a compressive gripping force on an electrical box inserted between the active and passive clamp jaws.

17. A tool according to claim 16, wherein the first spring means comprises:
   a) a clamp spring housing made of a rectangular box having one side open; and
   b) a coil spring having a first end and a second end, the first end being positioned in the clamp spring housing and the second end extending out of the clamp spring housing to engage the clamp cocking lever.

18. A tool according to claim 16, further comprising a second spring means attached to the second end of the trigger housing so that the trigger housing remains in a cocked position, wherein an electrical box may be inserted between the active and passive clamp jaws, unless and until an electrical box is placed into and against the surfaces of the active clamp jaw, wherein the trigger housing rotates to an uncocked position securing the electrical box between the active and passive clamp jaws.

19. A tool according to claim 13, wherein the second spring means is positioned so that the trigger housing will not rotate to an uncocked position securing the electrical box between the active and passive clamp jaws until the electrical box is properly aligned in the clamp jaws.

20. A tool according to claim 13, wherein the second spring means comprises:

a) an active clamp jaw made of flat bar and being generally "L" shaped having a horizontal surface and a vertical surface with a hole therein;
b) a box clamping trigger made of an "S" shaped member having an upper end a lower end and being rotatably connected to the second end of the trigger housing; and
c) a spring attached to the second end of the trigger housing and the box clamping trigger so that the upper end extends through the hole in the active clamp jaw and the lower end engages the horizontal portion of the active clamp body to secure the trigger housing in the cocked position unless and until an electrical box is placed into and against the vertical surface of the active clamp jaw and the upper end extending therethrough, thereby rotating the box clamping trigger, disengaging the lower end from the horizontal portion of the active clamp jaw and moving the trigger housing to the uncocked position.

21. A tool according to claim 18, wherein the second spring means comprises:
   a) an active clamp jaw made of flat bar and being generally "L" shaped having a horizontal surface and a vertical surface with a hole therein;
   b) a box clamping trigger defined by a rectangular flat bar having a top portion and a bottom portion, each portion having a notch therein to form a top tab and a bottom tab, the notches being disposed on the bar so that the tabs point in opposite directions, the bar being rotatably connected to the second end of the trigger housing; and
   c) a spring attached to the second end of the trigger housing and the bottom portion of the box clamping trigger so that the top tab extends through the hole in the active clamp jaw and the bottom tab engages the horizontal portion of the active clamp body to secure the trigger housing in the cocked position unless and until an electrical box is placed into and against the vertical surface of the active clamp jaw and the top tab extending therethrough, thereby rotating the box clamping trigger, disengaging the bottom tab from the horizontal portion of the active clamp jaw and moving the trigger housing to the uncocked position.

22. A tool according to claim 10, wherein the height adjustment means comprises:
   a) a high mount adjustment rod slidably connected to the bottom end of the main body, the high mount adjustment rod being made of an elongated tube having a rectangular cross-section and a scale affixed to at least one side, the tube being shaped and sized to slide into the main body;
   b) a low mount adjustment rod slidably connected to the passive clamp body, the low mount adjustment rod being made of an elongated tube having a rectangular cross-section and a scale affixed to at least one side, the tube being shaped and sized to slide into the passive clamp body;
   c) a means for securing the high mount adjustment rod in the main body; and
   d) a means for securing the high mount adjustment rod in the passive clamp body.

23. A tool for installing electrical boxes, which comprises:
   a) a main body made of an elongated tubular support member having a top end and a bottom end;

b) a holding means attached to the main body for releasably holding an electrical box;
c) a height adjustment means connected to the main body for positioning the electrical box at a predetermined distance above a floor, comprising (1) a high mount adjustment rod slidably connected to the bottom end of the main body, the high mount adjustment rod being made of an elongated tube having a rectangular cross-section and a scale affixed to at least one side, the tube being shaped and sized to slide into the main body, (2) a low mount adjustment rod slidably connected to the top end of the main body, the low mount adjustment rod being made of an elongated tube having a rectangular cross-section and a scale affixed to at least one side, the tube being shaped and sized to slide into the main body, and (3) a means for securing the high and low mount adjustment rods in the main body;
d) a depth adjustment means attached to the main body for positioning the electrical box at a predetermined depth relative to the face of an upright stud; and
e) an alignment means attached to the main body for positioning the electrical box so that the sides of the electrical box are parallel to the sides of an upright stud.

24. A tool for installing electrical boxes, which comprises:
a) a main body made of an elongated tubular support member having a top end and a bottom end;
b) a holding means attached to the main body for releasably holding an electrical box;
c) a height adjustment means connected to the main body for positioning the electrical box at a predetermined distance above a floor;
d) a depth adjustment means attached to the main body for positioning the electrical box at a predetermined depth relative to the face of an upright stud, comprising (1) a first elongated member having a first end and a second end, the first end being fixedly attached to the top vertical portion of the passive clamp body so that the elongated member is parallel to the horizontal portion of the passive clamp body, (2) a threaded nut fixedly attached to the second end of the first elongated member, (3) a second elongated member having a first end and a second end, the first end comprising two parallel flat bars and the second end comprising generally square tubing, the second elongated member being adapted to slide over the first elongated member so that the first end of the second elongated member extends beyond the top vertical portion of the passive clamp body, (4) a scale affixed to at least one of the parallel flat bars, (5) a stud face guide made of a rectangular flat bar fixedly attached perpendicular to the first end of the second elongated member, (6) a threaded rod having a first end and a second end, the first end extending through the second end of the second elongated member and the second end threaded into the nut, (7) an adjustment knob fixedly attached to the first end of the threaded rod, and (8) a means for stopping the threaded rod from moving longitudinally relative to the second end of the second elongated member so that when the adjustment knob is rotated, thereby rotating the threaded rod, the second elongated member will be drawn toward or pushed away from the first elongated member depending on the direction of rotation; and
e) an alignment means attached to the main body for positioning the electrical box so that the sides of the electrical box are parallel to the sides of an upright stud.

25. A tool for installing electrical boxes, which comprises:
a) a main body made of an elongated tubular support member having a top end and a bottom end;
b) a holding means attached to the main body for releasably holding an electrical box;
c) a height adjustment means connected to the main body for positioning the electrical box at a predetermined distance above a floor;
d) a depth adjustment means attached to the main body for positioning the electrical box at a predetermined depth relative to the face of an upright stud, comprising (1) a first elongated member having a first end and a second end, the first end being fixedly attached perpendicular to the bottom end of the main body, (2) a threaded nut fixedly attached to the second end of the first elongated member, (3) a second elongated member having a first end and a second end, the first end comprising two parallel flat bars and the second end comprising generally square tubing, the second elongated member being adapted to slide over the first elongated member so that the first end of the second elongated member extends beyond the main body, (4) a scale affixed to at least one of the parallel flat bars, (5) a stud face guide made of a rectangular flat bar fixedly attached perpendicular to the first end of the second elongated member, (6) a threaded rod having a first end and a second end, the first end extending through the second end of the second elongated member and the second end threaded into the nut, (7) an adjustment knob fixedly attached to the first end of the threaded rod, and (8) a means for stopping the threaded rod from moving longitudinally relative to the second end of the second elongated member so that when the adjustment knob is rotated, thereby rotating the threaded rod, the second elongated member will be drawn toward or pushed away from the first elongated member depending on the direction of rotation; and
e) an alignment means attached to the main body for positioning the electrical box so that the sides of the electrical box are parallel to the sides of an upright stud.

26. A tool according to claim 25, wherein the alignment means comprises a rectangular shaped block mounted at the center of the stud face guide to form perpendicular planar surfaces defined by opposite sides of the block and one face of the stud face guide.

* * * * *